United States Patent
Mayer et al.

(10) Patent No.: US 11,521,144 B2
(45) Date of Patent: Dec. 6, 2022

(54) AUTOMATED RESUPPLY BASED ON SENSOR DATA

(71) Applicant: Bottomless, Inc., Seattle, WA (US)

(72) Inventors: Michael Mayer, Seattle, WA (US); Liana Herrera, Seattle, WA (US)

(73) Assignee: Bottomless, Inc., Seattle, WA (US)

( * ) Notice: Subject to any disclaimer, the term of this patent is extended or adjusted under 35 U.S.C. 154(b) by 0 days.

(21) Appl. No.: 16/746,632

(22) Filed: Jan. 17, 2020

(65) Prior Publication Data

US 2020/0151639 A1    May 14, 2020

Related U.S. Application Data

(63) Continuation-in-part of application No. 15/655,342, filed on Jul. 20, 2017, now abandoned.

(60) Provisional application No. 62/368,857, filed on Jul. 29, 2016, provisional application No. 62/864,356, filed on Jun. 20, 2019.

(51) Int. Cl.
*G06Q 10/06* (2012.01)
*G01G 19/414* (2006.01)

(52) U.S. Cl.
CPC ..... *G06Q 10/06315* (2013.01); *G01G 19/414* (2013.01)

(58) Field of Classification Search
CPC ......... G06Q 10/06315; G06Q 10/0875; G06Q 30/0635; G01G 19/414; G01G 19/42
USPC .................................................. 705/29, 7.25
See application file for complete search history.

(56) References Cited

U.S. PATENT DOCUMENTS

| | | | |
|---|---|---|---|
| 4,696,359 A | * | 9/1987 | Glibbery ................ G01G 3/147 177/211 |
| 5,134,924 A | | 8/1992 | Vicker |
| 5,207,148 A | | 5/1993 | Anderson |
| 5,265,520 A | | 11/1993 | Giuliano |
| 6,000,317 A | | 12/1999 | Van Der Meer |
| 6,204,763 B1 | | 3/2001 | Sone |
| 7,065,501 B1 | | 6/2006 | Brown et al. |
| 7,673,555 B2 | | 3/2010 | Nosler |
| 7,894,938 B1 | | 2/2011 | Arora et al. |
| 8,429,026 B1 | | 4/2013 | Kolawa et al. |
| 9,760,833 B2 | | 9/2017 | Tsao |
| 2001/0034636 A1 | | 10/2001 | Ikemura et al. |
| 2002/0073148 A1 | | 6/2002 | Haines et al. |
| 2002/0116301 A1 | | 8/2002 | Chapman et al. |
| 2003/0070555 A1 | | 4/2003 | Reyhanloo |

(Continued)

FOREIGN PATENT DOCUMENTS

| | | |
|---|---|---|
| CN | 106927152 A | 7/2017 |
| CN | 206353350 U | 7/2017 |
| CN | 206480085 U | 9/2017 |

OTHER PUBLICATIONS

Mike Makkouk, A New Horizon in Household Inventory Management, 2021, PRWeb (Year: 2021).*

(Continued)

*Primary Examiner* — Garcia Ade
(74) *Attorney, Agent, or Firm* — Chernoff, Vilhauer, McClung & Stenzel, LLP (57) ABSTRACT

System for resupplying a consumable good based on sensors placed to measure the level or flow of a good, and using the data produced in predictive systems to determine the likelihood of running out of a good before resupply is likely to arrive, triggering an order which arrives before supply is exhausted.

14 Claims, 2 Drawing Sheets

(56) References Cited

U.S. PATENT DOCUMENTS

| | | |
|---|---|---|
| 2004/0199545 A1 | 10/2004 | Wagner et al. |
| 2004/0210621 A1* | 10/2004 | Antonellis ........... G06Q 10/087 709/200 |
| 2005/0034606 A1 | 2/2005 | In Albon |
| 2005/0074246 A1 | 4/2005 | Hayward et al. |
| 2005/0114235 A1 | 5/2005 | Snyder et al. |
| 2008/0052205 A1* | 2/2008 | Dolley ................. G06Q 10/087 705/28 |
| 2009/0106125 A1 | 4/2009 | Rock, Jr. et al. |
| 2009/0326829 A1 | 12/2009 | Liamos et al. |
| 2011/0082771 A1 | 4/2011 | Pritikin |
| 2012/0136741 A1 | 5/2012 | Agarwal |
| 2013/0218511 A1* | 8/2013 | Mager ................. G06Q 10/087 702/129 |
| 2014/0006117 A1 | 1/2014 | Kritt et al. |
| 2014/0074743 A1* | 3/2014 | Rademaker .......... G06Q 10/083 705/334 |
| 2014/0229343 A1* | 8/2014 | Higgins ............... G06Q 20/208 705/28 |
| 2014/0330739 A1 | 11/2014 | Falcone et al. |
| 2015/0186836 A1 | 7/2015 | Chouhan et al. |
| 2015/0302510 A1 | 10/2015 | Godsey et al. |
| 2015/0305551 A1 | 10/2015 | Rosati et al. |
| 2016/0048798 A1* | 2/2016 | Meyer ................... G01G 19/42 705/28 |
| 2016/0162715 A1 | 6/2016 | Luk et al. |
| 2017/0032446 A1 | 2/2017 | Merz et al. |
| 2017/0300984 A1 | 10/2017 | Hurwich |
| 2017/0345079 A1* | 11/2017 | Rangan .............. G06Q 30/0633 |
| 2018/0053153 A1* | 2/2018 | Mai .................... G06Q 10/0875 |
| 2018/0144290 A1 | 5/2018 | Alvo et al. |
| 2018/0144389 A1* | 5/2018 | Fredrich ............ G06Q 30/0271 |
| 2018/0315111 A1 | 11/2018 | Alvo et al. |
| 2018/0349980 A1 | 12/2018 | Alvo et al. |
| 2019/0087769 A9 | 3/2019 | Glasgow et al. |

OTHER PUBLICATIONS

Carol Byrd-Bredbenner, Assessing the home food environment nutrient supply using mobile barcode (Universal Product Code) scannign technology, 2010 (Year: 2010).*

* cited by examiner

AUTOMATED RESUPPLY BASED ON SENSOR DATA

CROSS-REFERENCE TO RELATED APPLICATIONS

This application is a continuation-in-part of U.S. patent application Ser. No. 15/655,342, filed Jul. 20, 2017, which claims the benefit of U.S. Provisional Patent Application No. 62/368,857, filed Jul. 29, 2016; this application also claims the benefit of U.S. Provisional Patent Application No. 62/864,356, filed Jun. 20, 2019, all of which are incorporated herein by reference.

BACKGROUND OF THE INVENTION

This application relates to methods and systems for facilitating resupply orders for consumable goods, particularly the capturing of levels of consumable commodities and the processing of such data for the purpose of resupply.

There are several automated systems for resupplying consumable goods that currently exist. The most basic of these systems is the subscription service where goods are delivered on a specific schedule. This system is deficient in cases where consumption rates are not regular and or equal to the frequency and amount of resupply. In these cases goods are often either chronically oversupplied or undersupplied.

Other systems track sensor data and resupply when levels of a good reach a certain "predetermined" level. These systems are deficient in cases where patterns of use are not uniform. For instance, a user could be a heavy consumer of a good on weekends and not on weekdays, and the user could be just above the "predetermined level" on a day leading up to the weekend, in this case the system would fail to resupply the user adequately due to an inability to factor in the user's consumption patterns. Another area of deficiency is the case where a user is either an unusually heavy or light consumer. In this case the heavy consumer would be frequently underserved by the "predetermined" level for triggering resupply and the light consumer would be chronically overstocked.

Many existing systems use "smart appliances" to measure the use of consumables. These systems are deficient because the user may use the consumable outside of the appliance, for instance a "smart toaster" would not be able to properly supply a user with bread because the user may eat both toasted and untoasted bread. Another deficiency of such systems is that the consumer may have a preferred brand of appliance, whether because the appliance has special proprietary technology or because of sentimental reasons, and would not like to use a different brand's "smart" version.

SUMMARY OF THE INVENTION

A method and system for resupplying a consumable good based on sensors placed to measure the level or flow of a good, and using the data produced in predictive systems to determine the likelihood of running out of a good before resupply is likely to arrive, triggering an order which arrives before supply is exhausted or otherwise sufficiently reduced in amount. In some cases, the triggering of an order has to do with the desired freshness of the product, such as coffee.

A sensor system used to track consumption levels and/or the use of consumables that includes a WiFi connected scale built to a specific size to hold retail packaged goods, commercial supplies, bulk goods (e.g., home or office or industry), etc., which can compose a subset of devices or all devices in the system.

One embodiment of the sensing aspect is WiFi enabled scales which are designed to sit underneath the stock of a consumable good and periodically send weight data with corresponding data, which may include additional information such as timestamp data, environmental data, product data, and battery levels over the internet to an API which stores the recorded data in a database for use in the predictive system.

In one embodiment of the system, an array of different custom scales are designed for dimensions of retail packaging. The packaging fits onto the scale in a way that allows for convenient removal and replacement of the consumable from and onto the scale. One example is a flat scale with the dimensions of the bottom of a coffee bag, so that the bag can be easily placed on top. The scale systems are not necessarily flat, for instance one possible scale for "fridge packs" of cans could be angled with the front lower than the rear so that cans naturally roll forward. Moreover, the scales do not necessarily resemble traditional scales. For example, the scale may resemble a container and have a built in weight sensor. Other embodiments may include, for example, receptacles with other level measuring sensors.

The scale systems described can be battery powered, spending the bulk of their time in sleep mode except to "wake up," read data, send data, and then sleep. For example, the scale may wake up for a short time period (e.g., momentarily) to read the data from the sensor, store the data in memory, and then sleep. For example, the scale may wake up for a slightly longer period of time (e.g., extended momentarily) to package the previously stored data together (and optionally read the data from the sensor and store the data in memory) and transmit it to the server, and then sleep. Further, the scale systems described can include a rechargeable power source, such as a rechargeable battery. Optionally, the battery may be recharged using harvested radio frequency energy.

The scale systems described can be equipped with a button used for configuring the device with WiFi, with or without credentials. For example, the wireless communication may include 3G, LTE, LoRaWAN, WiFi, or any other suitable wireless connectivity. Also, the scale system may interconnect with a hub, which may be powered more regularly and available for sporadic connection via wireless communication, where the hub includes interconnectivity for transferring data between the Internet and the scale system. Moreover, the hub may provide wireless recharging for the scale system. One technique for connecting the device with WiFi is by using the button, which when pressed will wake the scale and turn on a WiFi access point which uses a web server to serve a web form to the user, which when submitted creates sends the WiFi credentials to the user. The device stays in "configuration mode" for a set amount of time before returning to "sleep mode." If the device receives WiFi credentials before returning to "sleep mode" it attempts to connect using the credentials. In the case of the credentials working, the scale returns to sleep. In the case of the credentials not working, the scale remains in access point mode for a predetermined amount of time before returning to "sleep mode."

In an embodiment of the system, custom storage systems are built with sensors built in. One example would be a carafe for holding coffee beans which incorporates the previously described scale systems into the carafe itself. Also, the carafe may sit on top of a scale, such that it is readily removable from the scale. Further, the user may select whether to use the carafe to hold the goods or not use the carafe to hold the goods. In further embodiments, the scale system may be integrated into other devices, such as a coffee machine with a hopper, where the hopper includes an associated weight sensor or a sensor that determines the volume of product in the hopper.

In an embodiment of the system, the scale described previously may attach to the packaging, such as for example using a clip, a magnet, an adhesive, or other attachment technique, with the scale being removable once the current package is exhausted.

In an aspect of the system, an API is deployed which runs a web server which receives data from the sensor systems. The API accepts the data and stores it in a database for use in the system. Also, the API may process the raw data to format it in a suitable manner for later use.

In an aspect of the system, graphs of the consumption patterns are generated from sensor data and displayed within a variety of user interfaces. Also, the weight levels (or product volume) may be translated into "flows," or otherwise a computed consumption rate, for the user to be able to visualize consumption and/or stock levels over time. The consumption and/or stock levels may be displayed in a summary fashion.

In an aspect of the system, users can access an array of goods in a web store. When the user chooses a product, a corresponding sensing device which fits the device's packaging is shipped to them as well as the first order of the good. The user then stores the good in compliance with the device functionality, and, before the good runs out, the system sends the user resupply which the user places on the device as soon as the current good stock is depleted. Instead of selecting a single product, the user may also select a more generalized option which sends a variety of different products to a single sensor-enabled device. Additionally, users may create a queue of products to be sent in a serial fashion, one after the other, as a result of product consumption.

In an aspect of the system, the user can access a list of products associated with their accounts and sensing devices and change products through a web store. The user may also modify their preferences for what varieties of the products are sent to a particular sensing device. Further, the user may add and remove products from their queue of products. If the user is changing the product associated with a device, they are shown other products that fit with that device. When a user chooses another product, the system will begin ordering the new product when sensor data shows the current product will run out.

In an aspect of the system, the user is allowed a time window between when they're notified of impending resupply and the finalization and fulfillment of an order. The user receives a message when the system decides to re-order a given product which gives the user the option to cancel the order, remove the product entirely, or to switch their product preferences before the time window completes. The time window may be set by the system or set by the user, either in a static or dynamic manner. One possible embodiment of the system would show related products to the current product that the user has "synced," for instance if a user is receiving dark roast coffee currently, the related products would be other types of dark roast.

In an embodiment of the system, orders for resupply are routed to suppliers" existing inventory management and order processing systems. In another embodiment, orders may be sent using a communication channel such as e-mail with product details and optional shipping labels and other relevant information. In an alternative embodiment of the presently described invention, a system is provided for suppliers which allows for the processing and handling of orders. In this embodiment, the system can incorporate the predictive systems further up the supply chain, providing suppliers with data on optimal production timelines based on the predictions of their users" consumption patterns. Additionally, order may be maintained in a queue for vendors to either bid on or to pick up. Also, orders may start at a low price then be increased in price until a roaster accepts the order, or may be unpriced with the vendors bidding for a fixed period of time. In this manner, a more effective pricing model may be achieved for the goods, with vendors accepting the orders based upon available capacity to fulfill the orders.

In an aspect of the system, users are able to pause their accounts in order to prevent further resupply orders from being generated. Further, such a pause function may include a user selected or an automatic un-pause function whereupon the user would continue to receive products.

In an aspect of the system, the battery powered scale devices send battery life data along with levels and time data in order for the system to predict when the device is going to run out of battery. When the device is close to running out of battery the system can either message the user to charge the device, send the user a fully charged device or send the user a replaceable battery depending on the device design.

In an aspect of the system, sensor containing devices are powered by plugging into the wall instead of batteries.

In an aspect of the system, the sensor data representing the levels and/or use of a good is used to generate a table of probabilities representing the likelihood of running out of the consumable good for a range of future dates. There exist many methods for creating predictive systems for time-series data. All such systems are contemplated for the generation of the table of probabilities of running out. One embodiment of this system is a set of linear regressions run on a computer system, although a variety of machine learning systems are contemplated. Generally, this system will train a model on aggregated and user specific sensor data as well as other possibly predictive data. This model will take user-specific sensor data, possibly augmented with other predictive data, and output the table of probabilities of running out within given future dates.

In an aspect of the system, a table of probabilities of supply not arriving is generated for a range of future dates. This table could be generated using a range of techniques from a simple static table which generally represents typical shipping and fulfillment timelines for a given supplier, to a predictive system taking many types of data as an input including but not limited to distribution endpoints, distribution methods, user location, weather, etc.

In an aspect of the system, the table of probabilities for supply not arriving and the table of probabilities for the user running out of the good are combined to create a table of probabilities for a range of future dates of the user running out of a good before resupply arrives.

In an aspect of the system, the operator or the system provides a configuration representing at which probability of running out the system should trigger a resupply order. This configuration is imagined to include settings for any individual future date, specified future dates, and/or all probabilities combined.

In another aspect of the system, a non-technical user may be able to provide information about the desired order timing. This may be as a natural language setting such as "order earlier," "order later," or as a slider between priorities such as "freshness" or "not too much stock" or any other such representation of the tradeoff between early ordering and late ordering. Such a setting may be translated by the system as various thresholds of acceptable probability of running out. The system may periodically revisit the likelihood of running out before resupply and compare the user setting or the default, together with making adjustments.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
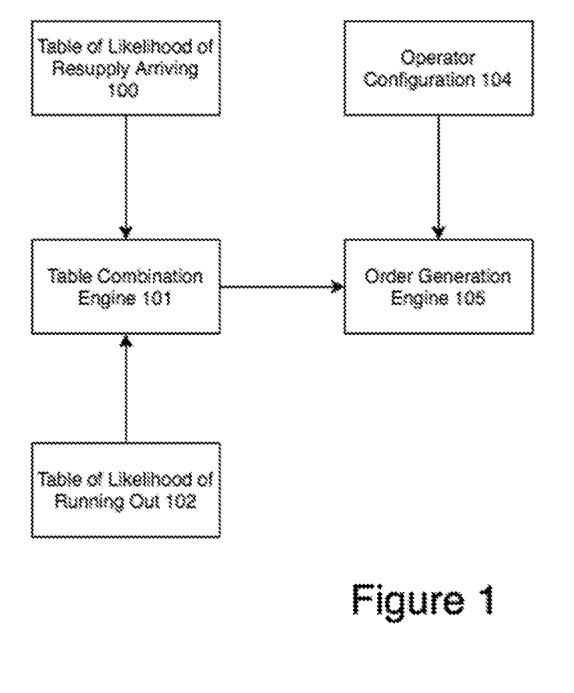
FIG. 1 illustrates a flow chart demonstrating overall functioning of system.

FIG. 1 describes the combination of the two aspects of the likelihood of resupply arriving table 100 with the likelihood of running out table 102 within a combination engine 101 which is compared based on operator configuration 104 in order to generate orders in order generation engine 105.

The likelihood of resupply arriving 100 in this embodiment is a simple table representing the best knowledge of shipping and order processing times for specific vendors and specific geographic locations of users. Other embodiments of the invention use a machine learning system to better generate table 100 using a variety of environmental and user/supplier specific data as well as historical order data. Generally 100 takes the shape of a set of probabilities for a range of future dates. One representation of this data could be as follows: [0.01, 1 day; 0.05, 2 days; 0.3, 3 days; 0.8, 4 days; 0.95, 5 days] with the syntax of [probability 1, timeline 1, probability 2, timeline 2].

Figure 2:
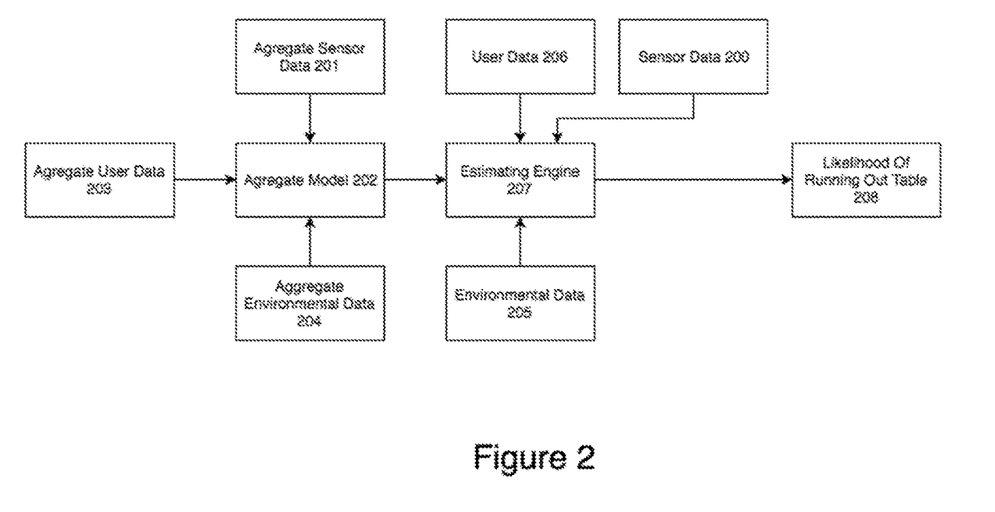
FIG. 2 illustrates a flow chart demonstrating specific generation of likelihood-of-running-out table.

The method for determining the table of running out 102 is more fully described in FIG. 2. For the purpose of understanding FIG. 1 it suffices to explain one embodiment of the table itself, which takes the form of probabilities and associated timelines/future dates. One possible embodiment is pairs of timelines and probabilities such as which could be represented as follows: [0.1, 1 day; 0.2, 2 days; 0.3, 3 days; 0.5, 4 days; 0.6, 5 days; 0.75, 6 days], with the syntax of [probability 1, timeline 1, probability 2, timeline 2].

The combination engine 101 combines the likelihood of resupply not arriving table with the likelihood of running out table. One embodiment of this combination is a simple combination of corresponding timelines and probabilities by multiplying corresponding timeline values. For instance, if the likelihood of running out table had for its first two values [0.2, 1 day; 0.3, 2 days] and the likelihood of resupply not arriving table had its first two values as [0.01, 1 day; 0.2, 2 days] the combined table would be [0.002, 1 day; 0.06, 2 days].

The operator configuration 104 can contain a range of different probability levels at which an order should be triggered. One embodiment would contain a threshold for probabilities for any given date, a set of threshold for specific dates, and a threshold for the cumulative total for all probabilities of all dates.

The order generation engine 105 compares the thresholds in the operator configuration 104 and the table outputted by 101 to determine whether an order should be created for a given user and product.

FIG. 2 elaborates one embodiment for the system that generates the likelihood of running out table.

Aggregates of sensor data 201, user data 203, and environmental data 204 are combined to generate an overall model 202 of the usage of the consumable. The aggregate sensor data 201 is the usage of the entirety or a subset of the sensor data from all sensors in the system. Aggregates of the user data 203 is the entirety or a subset of user data in the system. Aggregates of environmental data 204 is the aggregate of recorded environmental data for historical orders and users, which can include weather, holidays, and/or any other information that is found useful in predicting consumption.

The aggregate model 202 is imagined in a variety of different predictive systems that can take historical data and build a model that outputs probabilities. One embodiment is a series of regression models where features are generated to represent whether the user ran out for a range of timelines and the aggregated variables are regressed against the generated features. The model 202 can also take a variety of other forms of machine learning systems. The output of 202 is a model that can accept a set of sensor, user, and environment data and return a table of probabilities for a set of given timelines. Models can be trained on aggregate and user-specific data in order to create a specific model for each user.

In the estimating engine 207 the model outputted by 202 is applied with the input of specific user data 206, user-specific sensor data 200 and specific user/sensor environmental data 205 to output the likelihood of running out table 208.

In general, resupply orders are triggered based, at least in part, on when the user's stock levels of the goods are below the amount the user is expected to consume before they can be reasonably resupplied to the user. In some situations, the user does not properly place the goods on a scale after using a portion of the goods. For example, the user may place the goods on the counter for several days during which time the scale will show a zero weight (or substantially zero). For such situations, the system should distinguish between a situation where the user's goods have likely reached a level where a resupply order should be triggered, and a situation where the user has not replaced the goods properly on the scale, generally referred to herein as a "phantom" zero level.

One technique to distinguish between a phantom zero level and a situation suitable for triggering a resupply, is to ignore zero (or substantially zero) levels for a definable (or predetermined) temporal time period after a resupply should have been received by the user or other suitable time periods. This temporal time period, such as 3 days after the resupply has been received by the user, provides sufficient time for the user to notice that their stock is missing from the device, and to remedy the situation. In addition, the system may provide notifications, such as by an e-mail and/or text message and/or "push" notification, for the user to suitably place the goods on the scale. The temporal time period may be selected by the user, such as a user setting, or may be selected by the system as either a static or a dynamic time period.

Another technique to distinguish between a phantom zero level and a situation suitable for triggering a resupply, is to determine the likelihood that a zero (or substantially zero) level is actually occurring. A statistical measure of a series of measurements may be used to determine the likelihood that a zero (or substantially zero) level is actually occurring. For example, a series of weights of 9, 8, 7, 6, 5, 4, 3, 2, 1, 0 would likely indicate that a zero level is actually occurring. For example, a series of weights of 9, 8, 7, 6, 0 would likely indicate that a zero level is less likely to be occurring. A model may be trained, such as including a machine learning based processing engine which may include artificial neural networks. The machine learning may include a deep learning architecture, such as deep neural networks, deep belief networks, recurrent neural networks, convolutional neural networks, etc. The model may be trained that predicts the likelihood of a subsequent reading after a zero reading will be zero. Alternatively, the system may be trained on the likelihood that the user's level will be zero after a set temporal time period. The system may be suitably configured to assume the zero does not represent a real stock out so long as the likelihood of future readings being zero is below and/or above a threshold level.

Another technique to distinguish between a phantom zero level and a situation suitable for triggering a resupply, is to prompt the user to verify that a zero (or substantially zero) level does in fact represent a condition where the goods are out or substantially out. The prompt, may for example, permit the user to opt in to a resupply order or provide a predetermined amount of temporal time before the user may opt out to a resupply.

To maintain the accuracy of a weight based reorder system, it is desirable that the sensed weight accurately represents the actual weight of the goods. The system may use a suitable technique to verify the accuracy of the scale.

One technique to verify the accuracy of the scale is to periodically notify the user of the most recent weight that the system has sensed. The notification may be provided in any suitable manner. One manner of providing the notification is to send it to the user coinciding with regular communication with the user. For example, the last weight in the system may be sent along with any alerts notifying the user that the system will be reordering relatively soon. This permits the user to check the accuracy of the scale. For example, the notification may include visual information about the appearance of the volume of different weights permitting the user to select which is closest to their weight, therefore validating the approximate weight. Additionally, users may indicate an approximate weight (e.g., such as half the product) which may be validated to be within a certain tolerance of the recorded weight.

Another technique to verify the accuracy of the scale (e.g., weight sensing device) is to provide weight verification notifications at times when the weight on the scale is likely to be erroneous. One likely erroneous type of sensing is when the weight on the device exceeds the expected weight of the goods that is received by the user, which may be pre-weighed prior to being provided to the user (e.g., compared to sensed weight against the pre-weighed value). Another likely erroneous type of sensing is when the weight on the device has a negative value. In the event that the user responds to a prompt that the weight is inaccurate, the system may ignore data during a period that is likely to be inaccurate, or prompt the user to indicate the extent that the inaccurate data exists (e.g., 2 days).

In another embodiment, an additional implement may be used to hold the user's goods on the scale. For example, the user may use a container to hold the goods, and the zero level of the scale takes into account the weight of the container. In this manner, negative readings that are substantially equal to the weight of the implement may be treated as zero levels. For example, the weight of the implement may be unknown to the system, and accordingly, the system may ignore initial negative readings, and then subsequently ignore negative readings that are similar to past negative readings (since the weight of the additional implement remains unchanged).

In a weight based re-ordering system, it is desirable for the zero level of the weight sensing device to be accurate. In situations where the initial setup does not set the zero level accurately, or the zero level changes over time, the system may permit the user and/or the system to reset the level of the zero level of the device. Preferably, the resetting of the level of the zero level of the device is implemented using a graphical user interface on a display of a computing device. The graphical user interface may render to the user a graph of the previously recorded weight levels, and the user is permitted to select a level for the goods. The user is then preferably prompted to indicate that the selected level of the goods is a current "correct" level for the goods. In this manner, the zero level may be determined and used for subsequent measurements and/or be used to adjust the previous measurements in accordance with the adjusted zero level.

The preferred temporal time period between resupplying goods is between shorter than the time it takes to resupply but longer than a user's stock is not excessive, so that the goods remain fresh or otherwise the user does not have too much stock on hand. In many cases, the user's selection of the product size may not be ideal. In such situations, the user's typical consumption rate may be compared to the size of their product to determine the likely resupply temporal time period. When the resupply time period falls below a threshold, the user may either be prompted to select a larger product size, or the size of the product may be automatically increased. In a similar manner, if the resupply time period falls above a threshold, the user may either be prompted to select a smaller product size or the size of the product may be automatically decreased. This technique permits the system to accommodate the rate of consumption of the goods, to maintain the freshness of the goods.

Preferably, the system provides resupply of standardized sizes with the actual timing of the delivery being variable. Alternatively, the system provides a variable size of the resupply, with the timing of the delivery being maintained substantially constant. The preferred amount of goods may be selected by the user and/or the system in a manner that reduces the likelihood that the goods will run out while also reducing the likelihood of excessive unused goods for an extended period of time.

It is desirable that the sensed weight data accurately represents the level of the goods. In some cases, erroneous data may be automatically detected using statistical analysis, and removed or otherwise cleaned up. In other cases, erroneous data is sufficiently in error that the system preferably is reset to default levels so that additional improper inferences are not gathered based upon such erroneous data. In this manner, the user and/or system may indicate a preference to reset to default levels, with the previously acquired data being removed or other otherwise ignored. The resetting to default levels may be based upon a user input and/or the system automatically in response to analysis of the data. For example, if sufficient variations in the data exist for a selected time period, then the data may be reset. Further, the system may suggest a reset is appropriate using a message to the user which allows the user to accept the reset, modify which data should be ignored, or otherwise reject the reset.

In another embodiment, the system may accommodate the use of multiple different products used in combination with a single weight sensing device, either simultaneously or separately. The weight of each product is stored either at the time of shipping to the customer and/or at the time the customer adds the product to their account and/or via a database of known product weights. Distinguishing between which product is currently in the device and which product should be resupplied may then be determined by tracking at the differences in weight over time and comparing those to the weights of the anticipated products.

In cases where the differences are not equal to any given product, then combinations of products may be created. In this manner, each combination may be compared to changes in sensed weights until a match is found, with priority given to combinations of only two products versus, 3, 4 or 5, and if multiple combinations of the same amount of product are found then priority is provided to the products likely to be used most frequently. In such cases of collisions, the user may be asked via notification to indicate which products were removed from the device or alerts of a possible collision, and the system may determine the most likely state of their stock, such that the user can ignore the message if the inferred state is correct.

Users may be prompted with a representation of the system's understanding state of their stock for their validation. This may be done periodically, during other communication, or at times that the system determines high uncertainty. A graphical user interface may be included to allow the user to revise or update their stock levels. The graphical user interface may present the most statistically likely alternative potential stock statuses for the user to select, or permit revision via a history of recently added and/or subtracted products.

In another embodiment, the system may detect when an item is fully removed and items may be tracked during consumption on a multi-product sensing device. For example, this may be achieved by storing the weight of each item, then upon any change in their weight, the system may know which item was removed. When the item is placed back on the device, the new weight may be recorded, to determine the amount of product that was consumed. In this manner, collisions may be expected as weights tend to cross each other in amount. To detect collisions, a statistical analysis may be used to determine the likely consumption event sizes. For example, typically coffee consumption may be 15-60 grams (e.g., based upon user data or an aggregate of all user data) while a typical consumption event for sale may be 1-3 grams.

At the time of adding products to an account for resupply, or at the time of shipping products to customers and/or receiving products by customers, it is desirable to detect sufficiently identical weights, or collisions, in combinations of weights. This detection may be done by generating a list of possible weight combinations and comparing that to the weight of the product being added, and combinations of existing products and the product being added. Tolerances may be included to determine which collisions may be allowed based upon the likelihood of such a collision taking place. For example, it is unlikely that four products substantially equal in weight to another product are removed at once. However, two products substantially equal in weight are more likely to be removed.

In cases where potential collisions are detected, additional weight can be added or subtracted to a product to prevent the chance of such collisions. Such additional weight can be added via additional packaging, substitution with a different sized product, through a weighted sticker, or a number of other techniques. Additionally, such weight can be subtracted by substitution with another product, removing packaging, or by removing a proportion of product.

To increase the accuracy of the weight based measurement system, it is desirable that the weight sensed by the weight sensing device represents the actual weight of the product on the weight sensing device.

One technique to more accurately determine whether the weight sensed by the weight sensing device represents the actual weight is to periodically notify the user of one or more of the most recent sensed weights that the system has sensed or otherwise determined. The notification to the user of the one or more of the most recent sensed weights may occur in any suitable manner. One suitable manner is to primarily send notifications coinciding with otherwise scheduled communications with the user, such that the user does not receive any or a substantial number of additional notifications which would otherwise be likely to be ignored. By way of example, the system may send the user a notification that includes the one or more of the most recent sensed weight together with the notification (e.g., e-mail message, text message, notification on scale, etc.) alerting the user that the system is planning to refill their order in the near future.

It is also desirable that the system provides a notification to the user when the sensed weight from the weight sensing device is determined to be likely erroneous. One exemplary likely erroneous sensed weight is when the weight sensed by the device sufficiently exceeds the expected maximum stock weight that the user is expected to have received, such as sensing 25 ounces when the product provided to the user is 20 ounces. Another exemplary likely erroneous sensed weight is when the weight sensed by the weight sensing device is negative. Another exemplary likely erroneous sensed weight is when the weight sensed by the weight sensing device increases in a weight that is sufficiently dissimilar from the expected weight(s) to be added to the weight sensing device, based upon the product being provided to the user. For example, if the user currently has 5 ounces of product, and another 20 ounces of product is provided, a subsequently sensed weight of 12 ounces or 35 ounces would be considered sufficiently dissimilar from the expected weight of approximately 25 ounces (i.e., 5 ounces plus 20 ounces).

Many users of the system may use an implement, such as a plastic container, to hold the user's product on the weight sensing device. For example, the plastic container may be placed on the weight sensing device and the scale set to zero with the weight sensing device supported thereon, or otherwise the system is aware of the use of the plastic container and sets the zero level of the system to take into account the weight of the plastic container. In such a case, a negative value that is roughly equal to the weight of the implement (including adjustment for additional product contained therein, if desired) may be treated as a zero level. In the case that the system is unaware of the weight of the implement, the system may ignore initial negative readings, and then may ignore negative readings that are similar to past negative readings (since the weight of the implement is likely to remain unchanged).

The resupply of products may be triggered based upon the sensed weight by the weight sensing device, such as triggered based upon when the user's stock levels are below an amount the user is expected to consume before they can be reasonably resupplied. An exception is preferably made for situations where the user's weight level is substantially zero. In the case that the user's sensed weight level is substantially zero, the system should determine whether the user likely actually has no stock remaining, or alternatively, the substantially zero level is a result of the stock not being present on the weight sensing device.

One technique for distinguishing between "real" zero levels and "phantom" zero levels, is to ignore substantially zero levels for a predetermined temporal time period (such as 24 hours or 48 hours). This technique tends to be suitable because users tend to notice that their stock is missing from the device over such a temporal time period and correct the situation by relocating their stock on the weight sensing device. The predetermined temporal time period may be set by the system as either a static or a dynamic value, or may be selected by the user. Also, the system may provide a notification to the user after the predetermined time period to confirm whether or not the substantially zero level is representative of the stock having run out.

Another technique for distinguishing between "real" zero levels and "phantom" zero levels, may be based upon determining a likelihood that a zero is "real". A first example of weights may be 9, 8, 7, 6, 5, 4, 3, 2, 1, 0 and a second example of weights may be 9, 8, 7, 6, 0, 4, 5, 2, 1, 0. The first example, it is highly likely that the zero at the end of the series is "real", while it is more likely that the zero in the middle of the second example is "phantom". A statistical model may be used to distinguish between "real" zero levels and "phantom" zero levels. A model may be trained to distinguish between "real" zero levels and "phantom" zero levels. By way of example, a model may predict the likelihood that a subsequent measurement after a substantially zero measurement will also be a substantially zero measurement. If the likelihood is below a threshold, then the sensed substantially zero measurement may be ignored. Alternatively, the system may be trained on whether the user's level will likely be zero after a set amount of time. The system may then be configured to assume the substantially zero measurement does not represent a real "stock out" so long as the likelihood of future readings being substantially zero is below and/or above a set threshold.

The weight measurement device may include a mechanism for the tare level to be increased in accuracy. In the case that the initial setup does not accurately set the zero level, or otherwise the zero level changes over time, the weight measurement device may permit the user to reset the zero level to zero, preferably using a graphical user interface. By way of example, a graph may be presented on the graphical user interface of the previously sensed measurements. A level of the sensed measurement may be selected by the user on the graphical user interface of the current product level. The user is preferably prompted to confirm that the "correct" level has been selected. In this case, the new zero level is saved and used as the basis for subsequent measurements and/or used as the basis to adjust previous measurements. In another embodiment, the user is permitted to select the level which represents the actual zero level.

Another technique to maintain a suitable zero level is to take advantage of situations where the user has left the product off the scale for a period of time or otherwise temporarily removed the product from the scale. Both of these events are likely to occur over an extended period of time. The system may have the user confirm the new zero level, such as before it is subsequently used. This may be in the form of an alert, the result of which may include what the user's current level would be at the new zero level. An alternative display may be a graph with the levels adjusted for the new zero level.

As previously described, there may occur substantially zero levels that should be removed from the data as not representative of the user being out of product. Prior to removal of such substantially zero levels, the occurrence of such substantially zero levels may be used to zero out the weight measurement device. Moreover, if there are multiple (e.g., two) likely "true zero levels", the system may presume that the lower true zero level is a zero level without the container supported thereon and presume that the higher true zero level is a zero level with the container supported thereon.

The preferred period between restocking of products is somewhere slower than the time it takes to resupply but fast enough that a user's stock is not excessive (for reducing storage space and maintaining freshness). In many cases, the user's selection of product size may not be ideal. In such cases, the user's typical consumption rate may be compared to the size of their current product, including the amount remaining, to determine the likely restock time period. When the restock period falls below a threshold, the user can be either prompted to select a larger product size for resupply or the size of the product may be automatically increased for resupply. Alternatively, when the restock period falls above a threshold, the user can be either prompted to select a smaller product size for resupply or the size of the product may be automatically decreased for resupply.

In a typical system, the products are resupplied with standardized sizes where the timing of the resupply delivery is varied based upon usage. Alternatively, to provide an even more customized user experience, the size of the resupply is varied based upon the usage while the resupply period is maintained substantially constant. The preferred stock level may be selected based upon reducing the likelihood of the product being out while also reducing the amount of excessive product, or otherwise may be set by the user of the system.

It is desirable that the weight measurements in the system accurately represent the product levels. In some cases, erroneous data may be automatically cleaned from the system. In other cases, the erroneous data may be sufficiently "dirty" that the user is better off starting from scratch to reduce the likelihood of improper inferences being inferred from the sufficiently dirty data. The system may determine the data is sufficiently dirty or otherwise the user may select to start from scratch where data prior to starting from scratch is discarded or otherwise ignored.

The system may determine the data is sufficiently dirty based upon a statistical analysis of the data. For example, if the variation in the data exceeds a threshold during a temporal time period, then the data from that temporal time period may be ignored. If the system determines that the data is "dirty" based upon a standard, the system may trigger an alert to the customer to validate that their recent data appears to be correct, such as using a text message or a graph showing the recent readings.

In some embodiments, multiple different products may be stored in a container on a single weight sensing device or otherwise on a single weight sensing device. The weight of each product is stored either at the time of shipping to the customer or at the time the customer adds the product to their account. Which product is still in the device and which needs to be resupplied can then be determined by looking at the differences in weight over time and comparing those to the weights of the products.

In cases where the differences are not equal to any given product, then combinations of products may be used. Each combination may be compared to changes in weights until a match is found or otherwise the closest approximation, with priority given to combinations of only two products versus 3, 4 or 5, and if multiple combinations of the same amount of product are found towards the products likely to be used most frequently. In the case of collisions, the user may be asked using a notification to indicate which product(s) were removed from the device.

At the time of adding products to an account, or at the time of shipping products to customers, it is desirable to identify identical (or substantially identical) weights, or likely collisions in combinations of weights. This can be performed by generating a list of possible weight combinations and comparing that to the weight of the product being added, and combinations of existing products and the product being added. Tolerances can be put in place to determine which collisions may be allowed based on how likely the collision is to take place. For example, it is unlikely that four products exactly equal in weight to another product might be removed at once. However, two products are more likely to be removed.

In cases where potential collisions are identified, additional weight may be added or subtracted to a product to reduce the likelihood of such collisions. Weight can be added based upon additional packaging, substitution with a different sized product, through a weighted sticker, or a number of other mechanisms. Additionally, weight may be subtracted by substitution with another product, removing packaging, or by removing a portion of product.

To assist in the identification of which items are placed in or on the weight sensing system, additional identification mechanisms can be employed. One such mechanism may be QR codes embedded in packaging or in the form of stickers, used with image sensors on or around the weight sensing device. The images may be interpreted by a server with QR code recognizing software. Another identification technique may be using a radiofrequency identifying tag placed on items or embedded into packaging. Another identification technique is computer vision which may cross reference images against known product databases. Image sensors may be triggered on a set period or based on motion detectors. Items could be determined to be in and/or on the device based on whether their identified movement is towards the outside of the threshold of the device or not. Items may also be identified purely based on presence. Although such identification systems might not yield 100% coverage, in combination with the weight sensing described above, the system may approach 100% coverage. An example may be as follows. Imagine four possible items could possibly be in the box. Item A weighs 2 lbs., B weighs 3 lbs., C weighs 3.5 lbs. and D weighs 4.5 lbs. If the identification system is able to identify items A and B, then weights of 5 lbs.+3.5 lbs. would indicate A, B and C are in the box. In a similar manner, 5 lbs.+3.5 lbs.+4.5 lbs. would indicate all items are in the box, etc. With such an technique, identification devices can drastically reduce the complexity of determining items in the weight based system.

A multi-product restocking system may be devised without using weight at all and just using radio frequency identifiers or computer vision. In such a system, the stock levels would be periodically counted in order to determine the pace of consumption and likelihood of stock out.

A multi-product restocking system may suffer from a "cold start" problem, since users presumably already have some stock level in their home. One way to accommodate the existence of this stock would be to stagger the first shipment of items that will be tracked so that they arrive at a time that the user is likely to be running out of their existing stock. When a user signs up for an item, the user could be prompted for how many of the items they have, and information about expected consumption rate.

One technique for managing stock in a multi-product restocking system is to dynamically determine the necessary stock levels. This may be done by measuring the pace of consumption and calculating the maximum likely value of consumption between restock events. Another technique may be to have the user specify the maximum amount they expect to consume between restock events, and then the system restocks up to that level on each re-stock event.

An additional way of tracking stock levels is to tag each item with a removable tag. These tags could include magnetic encoding with an identifier, a QR code, a radiofrequency identifier, or some other technique of uniquely identifying the tag. The tag may then be counted by placing it in or through a reader. Each time the identifier is placed in or through the reader, the system may decrement the known stock level.

An additional way of tracking stock levels may be using radio frequency identifiers within range of a reader. When the tag loses range, the item represented by the tag is decremented from the known stock levels.

The rate of user consumption of a product may be used to determine their liking for the product. A computed consumption rate characterizes the user's liking of the product on and/or in the device for a given time period. This rate could be normalized by the user's typical consumption of products in the same category. This computed consumption rate may be used in conjunction with other user computed consumption rates to create a system that predicts what product a particular customer might like.

In another embodiment a pad may be used, that when compressed broadcasts a bluetooth beacon (or other wireless signal). Such a pad may function as a computer-less remote presence sensor. In general, a power source may be connected to a powered bluetooth beacon. The wire from the power source to the beacon may run through a switch. The switch is off when the pad has nothing on it, then the switch is toggled to be on with any sufficient weight being placed on the pad. In this manner, the placement of a product on the pad may be indicated by the broadcast.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system including a weight scale having an upper surface and a computing device included within said weight scale that includes a processor included within said weight scale for estimating a time to reorder different consumable goods comprising:
    (a) said weight scale including a single weight sensor operably interconnected with said upper surface configured to collectively sense at the same time the simultaneous total weight of said different consumable goods, where said weight scale is configured to simultaneously maintain each of said different consumable goods on said upper surface of said weight scale in a manner such that said different consumable goods are simultaneously weighed by said single weight sensor, where periodic use of any of said different consumable goods results in a decreased weight sensed by said single weight sensor of said different consumable goods, wherein said computing device automatically receives a plurality of weight measurements over time from said single weight sensor of said different consumable goods being simultaneously maintained on said weight scale in said manner such that said different consumable goods are simultaneously weighed where each of said plurality of weight measurements includes a single value that is representative of the simultaneous total weight of said different consumable goods;
    (b) said processor of said computing device interacting with a likelihood of resupply arriving function indicating a respective likely time for arrival of another one of each of said different consumable goods being simultaneously maintained on said upper surface of said weight scale to be shipped to a consumer;
    (c) said processor of said computing device interacting with a likelihood of running out function indicating a respective likely time for each of said different consumable goods being simultaneously maintained on said upper surface of said weight scale running out by said consumer based upon said plurality of weight measurements of said different consumable goods;
    (d) said processor of said computing device interacting with a consumer configuration function including configuration settings by said consumer related to at least one of said likelihood of resupply arriving function and said likelihood of running out function;
    (e) said processor of said computing device interacting with an order generation engine that determines a respective time to reorder each of said different consumable goods being simultaneously maintained on said upper surface of said weight scale, where each of said different consumable goods has a different respective time to reorder, based upon said likelihood of resupply arriving function, and said likelihood of running out function, and said consumer configuration function;
    (f) wherein said order generation engine is capable of discerning which of said different consumable goods has been depleted ("depleted consumable goods") only by interpreting said plurality of weight measurements;
    (g) said order generation engine interacting with a purchasing module that receives a respective order from said order generation engine and reorders said depleted consumable goods; and
    (h) said computing device anticipating the resupply of said depleted consumable goods by recording the expected weight of which of said consumable goods that has been reordered.

2. The system of claim 1 wherein said computing device determines a volume of each of said plurality of said different consumable goods.

3. The system of claim 2 wherein said computing device determines a plurality of volumes of each of said plurality of said different consumable goods over a temporal time period and a consumption rate of each of said plurality of said different consumable goods is presented to a user based upon said plurality of said volumes.

4. The system of claim 1 wherein one of said configuration settings permits adjusting a time window that modifies each of said respective time to said reorder.

5. The system of claim 1 wherein said purchasing module receives a respective order from said order generation engine and receives bids from a plurality of different vendors to supply said respective order, wherein said purchasing module selects a lowest one of said bids for supplying said respective order to said reorder a respective one of said depleted consumable goods.

6. The system of claim 4 wherein said adjusting said time window is based upon a natural language setting of said configuration settings.

7. The system of claim 4 wherein said adjusting said time window is based upon a graphical slider.

8. The system of claim 1 wherein said likelihood of running out function distinguishes between said plurality of weight measurements of said different consumable goods where (1) said different consumable goods are not being sensed by said weight sensor of said weight scale and (2) said different consumable goods have been consumed to a level where said time to said reorder occurs.

9. The system of claim 1 wherein said likelihood of running out function distinguishes between said plurality of weight measurements of said different consumable goods of (1) a phantom zero level and (2) a non-phantom zero level.

10. The system of claim 9 wherein said distinguishes is based upon ignoring low levels for a time period after which said respective time to reorder each of said different consumable goods is likely to have been received by said consumer.

11. The system of claim 10 wherein said system provides a notification to said consumer after a respective one of said different consumable goods is said likely to have been received by said consumer if said plurality of weight measurements of said different consumable goods is said non-phantom zero level.

12. The system of claim 9 wherein said distinguishes is based upon a statistical measure.

13. The system of claim 1 further comprising an implement holding said different consumable goods on said weight scale, and wherein said likelihood of running out function ignores said plurality of weight measurements that are less than zero.

14. The system of claim 1 wherein said order generation engine automatically modifies an amount of respective ones of said different consumable goods of said reorder based upon a temporal time period between a plurality of said reorders.

* * * * *